US009896138B2

(12) United States Patent
De Bock et al.

(10) Patent No.: US 9,896,138 B2
(45) Date of Patent: Feb. 20, 2018

(54) DRAG REDUCING DEVICE

(71) Applicant: WABCO Europe BVBA, Brussels (BE)

(72) Inventors: Robby De Bock, Beveren (BE); Wouter Dirk Van Dorsser, Numansdorp (NL); Hessel Jacobus Jongebreur, Rotterdam (NL); Gandert Marcel Rita Van Raemdonck, Delft (NL); Hjalmar Luc Maria Van Raemdonck, Brasschaat (BE)

(73) Assignee: WABCO Europe BVBA, Brussels (BE)

( * ) Notice: Subject to any disclaimer, the term of this patent is extended or adjusted under 35 U.S.C. 154(b) by 120 days.

(21) Appl. No.: 15/023,835

(22) PCT Filed: Jul. 24, 2014

(86) PCT No.: PCT/EP2014/002025
§ 371 (c)(1),
(2) Date: Mar. 22, 2016

(87) PCT Pub. No.: WO2015/043692
PCT Pub. Date: Apr. 2, 2015

(65) Prior Publication Data
US 2016/0251040 A1    Sep. 1, 2016

(30) Foreign Application Priority Data

Sep. 25, 2013  (NL) ...................... 2011492

(51) Int. Cl.
*B62D 35/00* (2006.01)
(52) U.S. Cl.
CPC ......... *B62D 35/001* (2013.01); *B62D 35/007* (2013.01)
(58) Field of Classification Search
CPC .. B62D 35/001; B62D 35/002; B62D 35/007; B62D 37/02
See application file for complete search history.

(56) References Cited

U.S. PATENT DOCUMENTS 4,142,755 A * 3/1979 Keedy ................. B62D 35/001
296/180.2
4,214,787 A * 7/1980 Chain ................. B62D 35/001
105/1.2
(Continued)

FOREIGN PATENT DOCUMENTS

CA    1079772 A  *  6/1980  ........... B62D 35/001
CA    2316584 A1 *  2/2001  ........... B62D 35/001
(Continued)

OTHER PUBLICATIONS

European Patent Office, Rijswijk, Netherlands, International Search Report of International Application No. PCT/EP2014/002025, dated Aug. 26, 2014, 5 pages.

*Primary Examiner* — Glenn Dayoan
*Assistant Examiner* — Paul Chenevert
(74) *Attorney, Agent, or Firm* — Brinks Gilson & Lione

(57) ABSTRACT

A drag reducing device for reducing aerodynamic drag at a trailing end of a moving bluff body includes a first and a second panel, which are movable connected to each other to move together from a collapsed to an extended configuration. At least one bias element is provided for exerting a spring force to the first panel structure to support the movement of the panels. The bias element includes a bendable spring rod. The spring rod extends along a curvature in a pre-tensioned condition in between the first and second panel from a back region B of the drag reducing device to a front region F of the drag reducing device, such that the spring rod exerts a spring force to the panel structure. The spring rod effectively supports at least one panel, while at the same time maintains a simple and reliable configuration of the drag reducing device.

18 Claims, 7 Drawing Sheets

(56) References Cited

U.S. PATENT DOCUMENTS

| | | | | |
|---|---|---|---|---|
| 4,433,865 A * | 2/1984 | Crompton, Jr. | B62D 35/001 | 296/180.4 |
| 5,332,280 A * | 7/1994 | DuPont | B62D 35/001 | 296/180.1 |
| 5,498,059 A | 3/1996 | Switlik | | |
| 6,092,861 A * | 7/2000 | Whelan | B62D 35/001 | 296/180.2 |
| 6,309,010 B1 * | 10/2001 | Whitten | B62D 35/001 | 296/180.1 |
| 6,799,791 B2 | 10/2004 | Reiman et al. | | |
| 8,550,539 B1 * | 10/2013 | Anderson | B62D 35/004 | 296/180.1 |
| 8,845,007 B2 * | 9/2014 | Ryan | B62D 35/001 | 296/180.1 |
| 8,851,554 B2 * | 10/2014 | Wayburn | B62D 35/001 | 296/180.1 |
| 9,145,177 B2 * | 9/2015 | Smith | B62D 35/001 | |
| 9,180,919 B2 * | 11/2015 | Breidenbach | B62D 35/001 | |
| 9,440,688 B2 * | 9/2016 | Smith | B62D 35/001 | |
| 9,457,847 B2 * | 10/2016 | Smith | B62D 35/001 | |
| 9,522,706 B1 * | 12/2016 | Breidenbach | B62D 35/001 | |
| 9,616,944 B2 * | 4/2017 | Baker | B62D 35/001 | |
| 9,663,156 B2 * | 5/2017 | Breidenbach | B62D 35/007 | |
| 2008/0048468 A1 | 2/2008 | Holubar | | |
| 2009/0179456 A1 | 7/2009 | Holubar | | |
| 2009/0200834 A1 | 8/2009 | Vogel et al. | | |
| 2014/0117713 A1 * | 5/2014 | Baker | B62D 35/001 | 296/180.4 |
| 2014/0339854 A1 * | 11/2014 | Tuerk | B62D 35/001 | 296/180.4 |
| 2015/0097393 A1 * | 4/2015 | Dieckmann | B62D 35/001 | 296/180.4 |
| 2016/0009322 A1 * | 1/2016 | Telnack | B62D 35/001 | 296/180.4 |
| 2016/0068200 A1 * | 3/2016 | Dieckmann | B62D 35/001 | 296/180.4 |
| 2016/0236726 A1 * | 8/2016 | Baker | B62D 35/001 | |
| 2016/0304138 A1 * | 10/2016 | Dieckmann | B62D 35/001 | |
| 2016/0318559 A1 * | 11/2016 | Baker | B62D 35/001 | |
| 2016/0347380 A1 * | 12/2016 | Dieckmann | B62D 35/001 | |
| 2017/0021873 A1 * | 1/2017 | Dieckmann | B62D 35/001 | |
| 2017/0129550 A1 * | 5/2017 | Baker | B62D 35/001 | |

FOREIGN PATENT DOCUMENTS

| | | | | |
|---|---|---|---|---|
| DE | 3817497 A1 * | 12/1988 | | B62D 35/001 |
| DE | 19524825 A1 * | 1/1997 | | B62D 35/001 |
| WO | WO 2016154224 A1 * | 9/2016 | | B62D 35/001 |

* cited by examiner

DRAG REDUCING DEVICE

TECHNICAL FIELD

The present invention relates to a drag reducing device for reducing drag at a trailing end of a moving bluff body. Further, the invention relates to a vehicle comprising such a drag reducing device and a method for opening and closing such a drag reducing device.

BACKGROUND OF THE INVENTION

The amount of power needed to move a vehicle over land or through the air increases with the speed of the vehicle, due to aerodynamic drag. The amount of power necessary to overcome aerodynamic drag directly translates into increased fuel consumption, and thus cost of operation.

Because of this, attention has been directed at reducing the aerodynamic drag of a wide variety of transport vehicles, such as trucks. The form drag of a truck is related in part to the shape of the frontal parts, such as the cab and the abruptness of its transition to the trailer or container. Typically, such forms are referred to as bluff bodies. The term bluff body relates to an aerodynamic definition for a particular geometry which lacks a streamlined shape. A bluff body has the characteristics that the bluff body contains, when placed in an air stream in a cross-section, an abrupt transition zone for the passing air stream. The abrupt transition zone causes drag.

There have been a variety of improvements made to improve the aerodynamic shape of these parts, such as by making the hood, windscreen, fenders etc. more streamlined in form, as well as by adding fairings to the cab roof, or the front of the truck box.

Another significant contributor to the form drag of a truck is the drag associated with the rear of the trailer. A typical trailer box will terminate with a large rectangular surface. This shape causes an area of reduced pressure to be created behind the trailer box as it moves over the highway, the result of which is to generate a retarding force that must be overcome with additional engine power, and thus additional fuel. Such shapes as the typical trailer box are also referred to as bluff bodies.

Accordingly, there have been efforts directed at adding a drag reducing device as a rear fairing to the rear of such a bluff body to lessen the reduced pressure area created at the rear, and thus improve the over the road fuel efficiency. However, the business of trucking is highly competitive and sensitive to operating costs, which include not only fuel costs but also capital costs and costs associated with any tasks that the driver or others must do to operate the truck and performing loading and unloading operations. In this regard, a rear fairing covering the back of the trailer box will typically also cover the loading/unloading doors. Therefore, such a rear fairing is cumbersome if permanently mounted to the trailer box. Likewise, dismounting and securing the rear fairing each time a loading/unloading operation is to be performed takes extra time, may require additional equipment to assist in the movement, stowage and positioning of the relatively large drag reducing device, and may not be within the skills of the driver and/or loaders.

Attempts have also been made to make the drag reducing device in some way retractable so that it does not impair off-highway activities. However, these efforts have to date not yielded devices having widespread use. There is therefore still a need for a rear fairing for transportation vehicles comprising bluff bodies, such as railroad carriers, busses, trucks and truck trailer boxes, which ably accommodates both aerodynamic and ease of use considerations to provide the user sufficient increased profitability to warrant its use.

From U.S. Pat. No. 5,498,059 such a drag reducing apparatus is known which attributes to this need. The drag reducing apparatus comprises a top panel and a side panel. The top panel is rotatably secured to a vehicle body to permit the top panel to assume a first collapsed configuration adjacent the vehicle body and a second position extended away from the vehicle body. The side panel is rotatably secured to a vehicle body to permit the second panel to assume a first collapsed configuration adjacent the vehicle body and a second extended configuration extended from the vehicle body. The top and side panels are joined together to permit the top and side panels to fold approximately together when the top and side panels are adjacent the vehicle body. The top panel comprises two joined panel sections to permit the top panel to be folded when in the first collapsed configuration and unfolded when in the second extended configuration.

SUMMARY OF THE INVENTION

The general object of the present invention is to at least partially eliminate the above mentioned drawbacks and/or to provide a useable alternative. More specific, it is an object of the invention to provide a drag reducing device which either satisfies to high aerodynamic requirements and at the same time to practical requirements which count during use of transportation vehicles.

Particularly, it is an object of the present invention to provide a device for reducing the drag at the rear of such vehicles wherein this apparatus is easy and convenient to move from a collapsed configuration to an extended configuration and vice versa while at the same time allowing preferably a full lateral opening of cargo doors for loading and unloading a cargo space.

Particularly, it is an object of the present invention to provide a drag reducing device, wherein a control mechanism for moving panels of the drag reducing device from a collapsed configuration to an extended configuration has just a few, but preferably no mounting points at a cargo door to increase a compatibility of the drag reducing device with a great variety of cargo doors. Preferably, the design of the drag reducing device allows an easy storage or deployment of the device without requiring the use of any lift poles, cranks, winches or other auxiliary tools or equipment which thereby greatly encouraging actual use of the improved drag reducing apparatus. According to an aspect of the invention, a drag reducing device is arranged for reducing aerodynamic drag at a trailing end of a moving bluff body. The drag reducing device is connectable to the trailing end. The trailing end may have a rectangular outer contour, but may also be circular. The bluff body may be a cargo box, but may also be cylindrical cargo tank for liquids. The device comprises a first panel structure which comprises at least a first and a second panel. The first panel and the second panel are movably connected to each other to move together from a collapsed configuration to an extended configuration. In the collapsed configuration the panels are positioned close to the bluff body. In the collapsed configuration the drag reducing device is in a storage position. In the collapsed configuration, the drag reducing device allows easy handlings at a storage terminal e.g. opening and closing of cargo doors. In the extended configuration, the panels of the panel structure are rotated away from trailing end of the bluff body. In the extended configuration, the drag reducing device provides an aerodynamic geometry at the end of the bluff body which provides a reduction of aerodynamic drag when the bluff body moves.

The first panel of the first panel structure is rotatable about a first pivot axis to move the first panel from the collapsed configuration to the extended configuration. The second panel of the first panel structure is rotatable about a second pivot axis to move the second panel from the collapsed configuration to the extended configuration. The first pivot axis extends substantially perpendicular to the second pivot axis. In particular, the first and second pivot axis extends along a backside positioned edge of the respectively first and second panel.

The first panel and the second panel are connected to each other about an edge in a side positioned region of the respectively first and second panel. The first panel and the second panel are connected at a coincident lateral region. The first and second panels are preferably rigid panels, which means that the panels provide planar surfaces which are arranged to maintain its shape under aerodynamic and mechanical loading and to prevent large deformations during normal use. The panels may be framed or made out of rigid plate material. To allow a rotating movement of the first and second panel to and fro the extended configuration, at least one of the first panel and the second panel is divided into panel sections. The panel sections are pivotally connected to each other about a section pivot axis. The section pivot axis originates from an origin which is a point of intersection of the first and second pivot axis. The section pivot axis extends under an inclined angle away from the respectively first and second pivot axis in a plane defined by the corresponding panel. Preferably, the section pivot axis extends about a straight line.

The drag reducing device according to the invention comprises at least one bias element. The bias element is provided for exerting a spring forced to the first panel structure to support a movement of the panels from the collapsed configuration to the extended configuration. The bias element is provided to at least partly compensate gravity forces acting on the panels.

The drag reducing device according to invention is improved in that the at least one bias element comprises a first bendable spring element. Bendable means that the spring element is elastically deformable by bending for generating a biasing force. The spring element is elongated. The bendable spring element includes a bendable longitudinal spring rod which has a first end and second end. In the drag reducing device, the spring element is mounted in a curved pretensioned condition in the collapsed configuration. Preferably, the bendable spring rod has a straight form in an unloaded state and a curved form in a loaded state. The bendable spring rod is assembled in the drag reducing device in the loaded state. The longitudinal rod of the spring element extends along a curvature in between the first and second panel from a back side region of the drag reducing device to a front side region of the drag reducing device. Due to the curvature, the spring rod is deflected from a straight form which deflection provides the pre-tensioned condition. At least one of the first and second and is connected at a connection point in a backside region of the drag reducing device. The connection point may be positioned at a panel or at the bluff body, e.g. at the trailing end. At least one of the first end and the second end is connected to a panel in a front region of the drag reducing device. Preferably, the at least one of the first and second end is connected to a front side positioned edge region of the panel. Preferably, the at least one of the first and second end is connected adjacent the front edge of the panel.

Advantageously, the bendable spring element provides an effective support to the movement of the panels of the first panel structure from the collapsed positioned to the extended position. Due to a pretension caused by the bending of the spring element along the curvature, the spring element exerts an outwardly directed force to at least one of the panels. Herewith, occurring gravity forces on the panels are at least partly compensated. The spring element balances the occurring gravity forces, which allows a relatively light movement of the panel structure.

In comparison with a spiral spring arranged about a pivot axis of a panel, as disclosed in the prior art U.S. Pat. No. 5,498,059, the bendable spring rod provides an advantage in that the exerted force acts at a relatively large distance away from the pivot axis which provides a larger moment of force to the panel. Herewith, the force exerted by the bendable spring rod is applied to the panel in a more effective manner.

Preferably, the bendable spring rod is positioned in between two neighboring panels. An implementation of the bendable spring rod in between two neighboring panels and a connection of the ends of the spring rod to the neighboring panels further provides an advantage in that the installation of the drag reducing device does not require connection points for connecting the spring rod to the trailing end. The unnecessary connection points at a trailing end for connecting the spring rod allows an installation of the drag reducing device to a larger variety of trailing ends.

One of the further advantages of the ease of deployment of the device of the present invention is that an upper horizontal panel need not be constructed to meet specifications for support of a significant amount of snow or water thereon. Due to the great ease with which the horizontal panel and other panels can be deployed and collapsed, an operator can store the device at night and thus prevent an overnight accumulation of snow or ice thereupon. This will allow deployment of a clean unencumbered panel every morning or whenever an operator initiates operation of the vehicle or moving body. Without these strength requirements the panels of the drag reducing device according to the invention can be constructed of more lightweight materials thereby further enhancing energy conservation advantages of this construction. Since the overall improved design of the present invention is a significantly strong yet lightweight device, and because it can be attached directly to the trailing end of the moving bluff body, the device of the present invention will be more firmly secured to the moving bluff body than other prior art devices, thereby increasing reliability and reducing chances for catastrophic failure.

A variety of embodiments of the first panel structure including an implementation of at least one bendable spring element is possible. The embodiments have in common that the spring element is present in a pre-stressed condition in which the spring element extends in between two neighboring panels along a curvature from a back region of a panel to a front region of a neighboring panel.

In an embodiment of the drag reducing device according to invention, the first panel is a side panel and the second panel is a top panel when mounted to the bluff body. The first pivot axis of the side panel is oriented in a substantially vertical position when mounted to the bluff body. The second pivot axis of the top panel is oriented in a substantially horizontal position when mounted to the bluff body. The side panel and the top panel are connected to each other along an intersecting lateral region of the first and second panel. In particular, the side and top panel are connected to each other along lateral side edges of the panels. To allow a rotational movement of the first and second panel about the respectively first and second pivot axis, one of the respective side and top panel is divided into sections. In an embodiment, the side panel may be sectioned. In another embodiment, the top panel may be sectioned. In a particular embodiment the side panel and the top panel may be sectioned. The sectioning of a panel allows the first panel structure to be folded to and fro a collapsed configuration. For safety reasons, the side panel is preferably non-sectioned and formed by only one single panel.

In an embodiment of the drag reducing device according to invention, the second end of the longitudinal rod is connected at the front region of a panel section. The connection to a panel section is advantageous in that the spring force acts directly onto the panel section which effectively brings the panel section in a predetermined position in the extended configuration. In the predetermined position in the extended configuration, the panel section is aligned with an adjacent panel section of the panel. The panel sections of the panel preferably form a substantially flat panel in the extended configuration. Advantageously, the spring element provides a pre-tension to maintain the panel section in the predetermined position during a movement of the bluff body.

In an embodiment of the drag reducing device according to the invention, the second end of the longitudinal rod is connected at an end region of the section pivot axis of a sectioned panel. Preferably, the longitudinal rod is connected at the end, in particular at a distance of at most 50 cm, more in particular at a distance of at most 30 cm, away from the end of the section pivot axis at the front edge of the panel. Preferably, the longitudinal rod is connected at a position at the section pivot axis which position is positioned in between at least 75% of the length of the section pivot axis away from the origin of the section pivot axis and the front edge of the panel. Advantageously, the spring force generated by the longitudinal rod acts at a position at the section pivot axis which effectively brings the panel sections into a desired alignment in the extended configuration of the panel structure.

In an embodiment of the drag reducing device according to invention, the first end of the longitudinal rod is connected at a region adjacent the pivot axis of a panel neighboring the sectioned panel. In particular, the first end is connected close to the pivot axis at a distance of at most 20 cm, in particular at most 10 cm away from the pivot axis. A connection of the second end of the longitudinal rod to a front region of the sectioned panel and a connection of the first end of the spring rod close to the pivot axis of the neighboring panel provides a positioning of the spring rod close to the panels of the panel structure which allows a free access to operate cargo doors at the trailing end.

In an embodiment of the drag reducing device according to invention, the first panel structure further comprises a third panel. At a lateral region, the third panel is movable connected to the first panel to move together with the first panel from the collapsed configuration to the extended configuration. The first or third panel is sectioned to allow the first panel to move together with the third panel. The third panel is rotatable about a third pivot axis to move the third panel from the collapsed configuration to the extended configuration. The at least one of the first or third panel is sectioned and comprises at least a first and second panel section which are pivotally connected to each other about a section pivot axis, wherein the section pivot axis originates from a point of intersection of the first and third pivot axis and which section pivot axis extends under an inclined angle away from the respectively first or third pivot axis in a plane defined by the respectively first or second panel. The first, second and third pivot axis together define a C-shape. The second pivot axis extends in parallel with the third pivot axis. The C-shape encloses an inner space. The third panel is positioned opposite the second panel. The first, second and third panel enclose the inner space. Advantageously, the third panel of the first panel structure may form a bottom panel of the drag reducing device. By providing a second panel structure opposite the first panel structure, in particular in mirror symmetry with the first panel structure, the drag reducing device may provide a fully enclosed inner space at the trailing end. Herewith, the drag reducing device may reduce drag forces which occur all-round a moving bluff body.

In an embodiment of the drag reducing device according to invention, the at least one bias element comprises a second elongated bendable spring element to exert a spring force to the third or first panel. Like the first spring element, the second spring element includes a bendable longitudinal spring rod having a first and second end. The longitudinal spring rod extends along a curvature in a pre-tensioned condition in between the first and third panel from a back region of the drag reducing device to a front region of the drag reducing device. Advantageously, the second spring element supports the first panel structure in addition to the first spring element to move from the collapsed configuration to the extended configuration.

In an embodiment of the drag reducing device according to the invention, the second end of the second spring rod is connected to a front region of a panel section of the sectioned first or third panel. Preferably, the third panel is sectioned, such that the second end of the second spring rod is connected to the front region of the third panel. Like the first spring element, the second end of the longitudinal rod of the second spring element is preferably connected at an end region of the section pivot axis of a sectioned panel. Preferably, the first end of the longitudinal rod is then connected at a region adjacent the pivot axis of the panel neighboring the sectioned panel. By exerting a spring force to the third bottom panel, the drag reducing device provides a resistance against occurring vibrations.

In an embodiment of the drag reducing device according to the invention, the first and second spring elements are integrated into a one-piece item. The first and second spring elements form an integrated spring element to provide a spring force on two panels of the panel structure. Instead of two relatively short separate spring elements which are aligned positioned in the drag reducing device, the two spring elements are replaced by a single relatively long spring element. Preferably, the integrated spring element provides a spring force on two opposite positioned panels. Preferably, the integrated spring element provide a spring force which acts on the second and third panel of the panel structure, wherein the second and third panel define a top and bottom panel. Advantageously, only one spring element suffices to move the panel structure to the extended configuration.

In an embodiment of the drag reducing device according to invention, the integrated spring element has an intermediate point. At the intermediate point, the spring element is preferably connected at a back region of the drag reducing device. Preferably, the intermediate point of the integrated spring element is connected in a region at the first panel which is close to the first pivot axis. Preferably, the intermediate point of the integrated spring element is connected to the first panel at a distance of at most 20 cm, in particular at most 10 cm away from the first pivot axis. A connection to the first panel is advantageous, because herewith a stand-alone drag reducing device is provided. No connections of the spring element to the trailing end of the block body are required which allows an easier installation of the drag reducing device.

In an embodiment of the drag reducing device according to invention, the drag reducing device comprises a control mechanism for moving at least one panel of the panel structure, wherein the control mechanism of the drag reducing device has no fixation points at the cargo doors for loading or unloading the cargo space. The control mechanism is connected to the panel structure itself. Advantageously, the drag reducing device can be mounted as a stand-alone unit to a trailer end. The omission of fixation points at the cargo doors increase the compatibility of the drag reducing device with a high variety of available trailer ends.

In an embodiment of the drag reducing device according to the invention the integrated spring element is only connected at its free ends to opposite panels of the panel structure. A middle region of the integrated spring elements may be left freely movable.

In an embodiment of the direct reducing device according to invention, the spring element has a varying thickness over its length. The spring element may have a thickened portion to provide locally a more rigid part of the spring element.

In an embodiment of the drag reducing device according to invention, the spring element comprises a bundle of longitudinal spring rods. The bundle of spring rods is selectively arranged and comprises an amount of spring rods which complies with a required pre-tensioned in a particular drag reducing device. The bundle of spring rods may comprise spring rods of a variety of lengths to obtain a spring element with a varying thickness over its length. Herewith, the generated amount of power to open the panel structure may vary about a distance from the collapsed configuration to the extended configuration.

In an embodiment of the drag reducing device according to the invention the spring element comprises a reinforced plastic material. Preferably, the plastic material includes an aramid or carbon fiber. Advantageously, the plastic material contributes to a sustainable and lightweight solution.

In an embodiment of the drag reducing device according to the invention, the spring element comprises a reinforcing structure of a metal material. Preferably, the metal material is spring steel. Preferably, the reinforcing metal structure includes a metal wire. Preferably, the metal wire is embedded within the spring element which may advantageously prevent corrosion. In particular, the metal wire extends about the whole length of the spring element. Advantageously, the reinforcing metal material provides a required power for biasing the panel structure of the drag reducing device. In comparison with a plastic material, the metal material may provide more power when using the same geometry of the spring element.

In an embodiment of the drag reducing device according to the invention, the sectioned panel of the panel structure further comprises a blocking element to block a rotation of the first panel section about the section pivot axis with respect to the second panel section. Preferably, the blocking element of the sectioned panel blocks a rotation exceeding 180°. The blocking element prevents a too far movement of the panel sections and maintains the panel sections aligned in the extended configuration. Advantageously, the spring element may be arranged to generate a spring force which is large enough to overcome acting gravity forces on the panels and acting dynamic forces caused by the drag onto the device during a movement of the bluff body. The dynamic forces might otherwise cause problems like vibrations or other undesired displacements of the panels.

In an embodiment of the drag reducing device according to the invention, the first panel defines a first side panel of the drag reduction device. The second and third panels respectively define a top and bottom panel of the drag reduction device.

In an embodiment of the drag reducing device according to the invention, the top and bottom panel are sectioned across a section pivot axis.

In an embodiment of the drag reducing device according to the invention, the drag reducing device comprises a first and a second panel structure, wherein the first panel structure is arranged opposite, in particular in mirror symmetry with the second panel structure. The first and second panel structure may for example be arranged in mirror symmetry when the drag reducing device has to be mounted to a trailing end which has a substantially symmetrical arrangement of cargo doors. Preferably, the first panel structure comprises at least the first panel which defines a side panel and the second panel which defines a top panel.

Further, the invention relates to a vehicle provided with a drag reducing device according to the invention as presented above. The vehicle may be a road or rail cargo carrier. The vehicle comprises a bluff body. Typically, the cargo space of the vehicle defines the bluff body. The term bluff body relates to an aerodynamic definition for a particular geometry which lacks a streamlined shape. A bluff body has the characteristics that the bluff body contains when placed in an air stream along its length an abrupt transition zone for the passing air stream. The abrupt transition zone causes drag. The bluff body of the vehicle may have a flat top surface, a left flat first side surface, a right flat second side surface and a trailing end. Typically, the trailing end of the bluff body has a rectangular outer contour, like a cargo box. Alternatively, the trailing end may have a rounded outer contour. The bluff body may e.g. be a liquid cargo tank. The drag reducing device according to the invention is connected to the trailing end of the bluff body. Preferably, the trailing end is provided with at least one pivotally arranged cargo door, wherein the drag reducing device is connected to the cargo door, such that the drag reducing device is movable together with the cargo door.

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the present invention.

BRIEF DESCRIPTION OF THE DRAWINGS

In the drawings,

In FIGS. 1-3, the drag reducing device is denoted overall by reference numeral 1.

DETAILED DESCRIPTION OF THE DRAWINGS

Figure 1A:
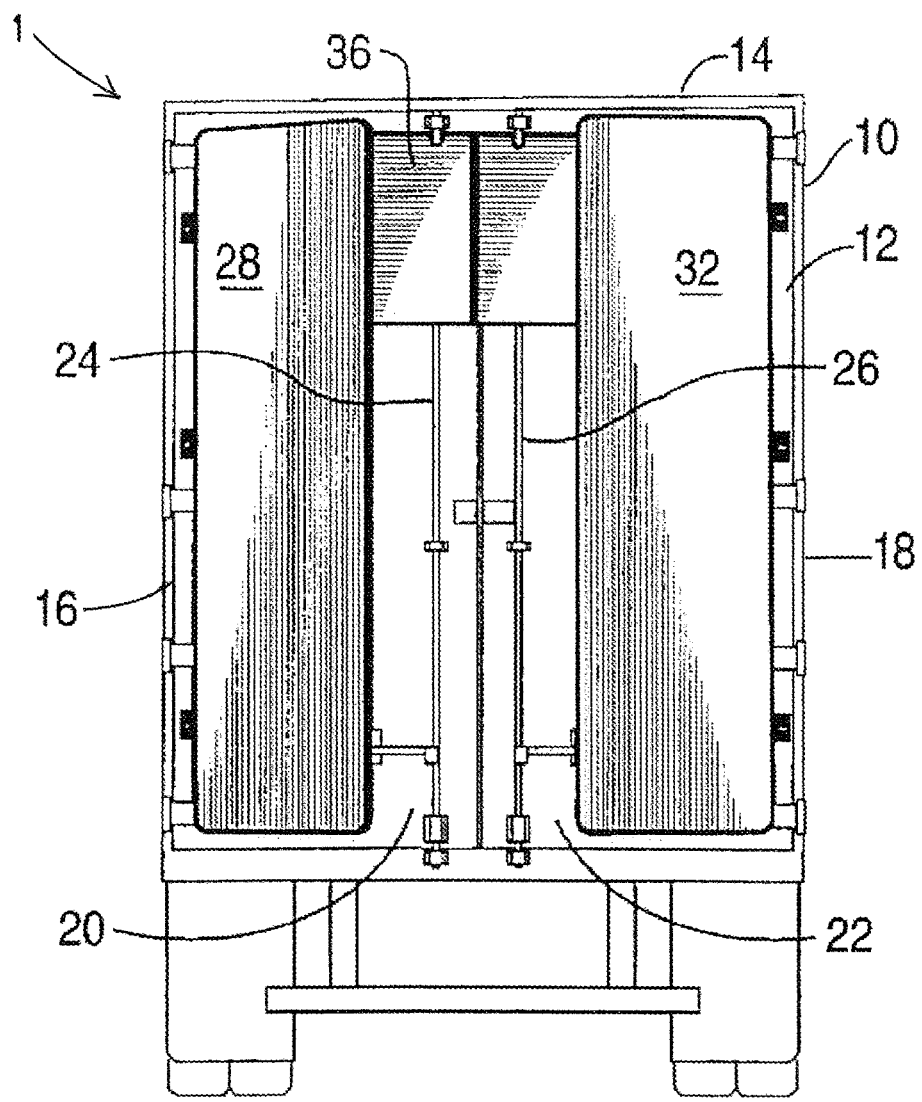
FIG. 1A-C disclose in several views a drag reducing device according to the prior art which includes common features with an embodiment of the drag reducing device according to the invention.

Identical reference signs are used in the drawings to indicate identical or functionally similar components. To facilitate comprehension of the description, the words vertical, horizontal, longitudinal, cross-sectional are used with reference to the gravity in a non-limiting way. The wording is not intended to be used in a pure mathematical sense, but in a practical sense to explain the working and configuration of the drag reducing device.

Figure 1B:
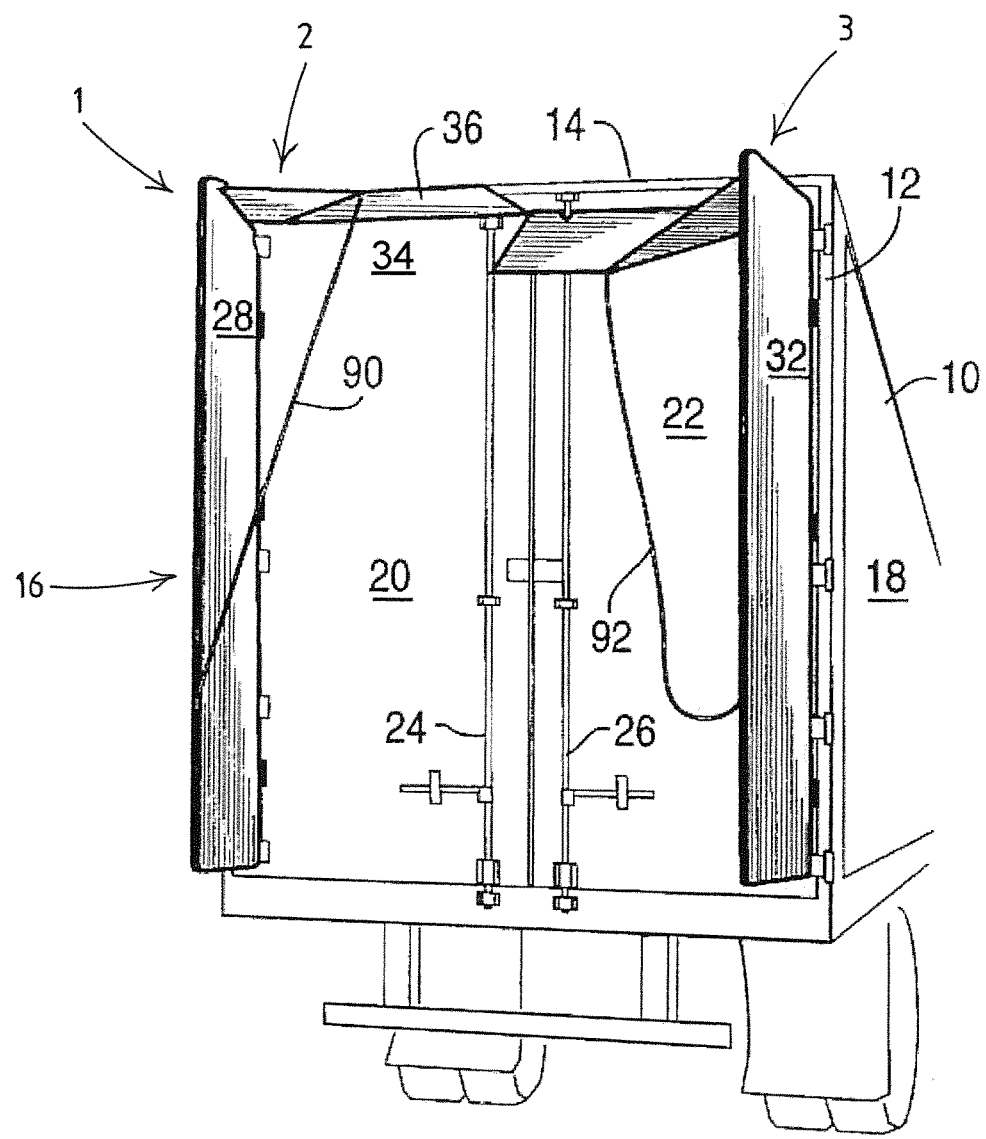
Figure 1C:
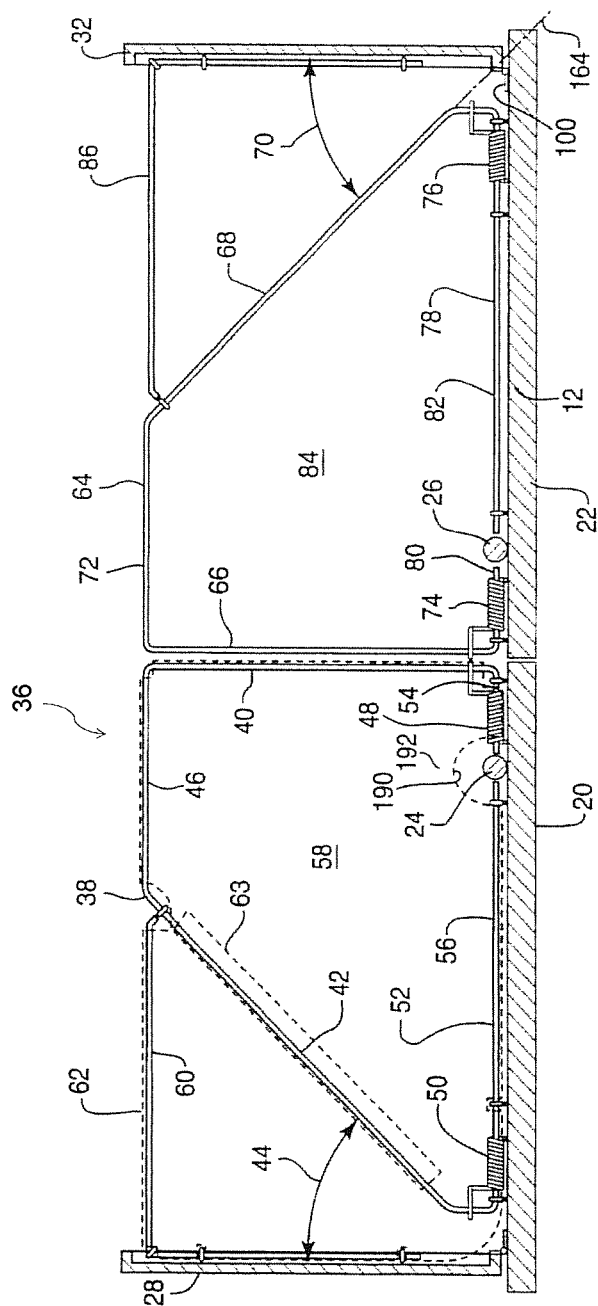

FIGS. 1A and 1B disclose in a perspective view a prior art drag reducing device as disclosed in U.S. Pat. No. 5,498,059. This prior art drag reducing device has a lot of relevant features in common with a preferred embodiment of the drag reducing device according to the invention. FIG. 1A discloses the drag reducing device in a collapsed configuration. FIG. 1B discloses the drag reducing device in an extended configuration. FIG. 1C discloses the drag reducing device in a bottom plan view. Features and aspects described for or in relation with this prior art embodiment may be suitably combined with features and aspects of embodiments according to the invention, unless explicitly stated otherwise.

The drag reducing device 1 according to the invention improves the aerodynamics of a moving bluff body 10 by providing panels extending rearwardly therefrom for the purpose of capturing vortexes there adjacent to inhibit the back pressure and thereby enhance the fluid flow characteristics of an otherwise flat trailing end 12. Such a design is particularly usable with a moving bluff body 10 having a top surface 14 along with a first side surface 16 and a second side surface 18 extending there over. The moving body 10 is a bluff body like a trailer box, bus or container, and which is here illustrated as a cargo space, in particular a cargo space of a railroad or road cargo carrier. Such constructions are most commonly used at the rear end of a pulled trailer or rigid trailer truck which includes a first vertically extending cargo door 20 and second vertically extending cargo door 22 constructed meeting in the center of the trailing end 12 for closing thereof. The first door 20 preferably includes a first locking bar 24 extending vertically there along and a second door 22 which includes a second locking bar 26 mounted on the external surface thereof. The locking bars 24, 26 extend vertically with locking bar handles extending horizontally therefrom. This is the conventional configuration of a trailer or truck body utilized in the configuration of most trucking vehicles currently used. It should be appreciated that the drag reducing device 1 according to the present invention can be utilized with any moving bluff body 10 having a trailing end 12 but the description of a particular embodiment will be particularly directed toward a conventional highway trailer design with two horizontally swinging doors and two or more vertically extending locking bars such as bars 24 and 26 on the outer surface thereof. It is remarked that the drag reducing device of the present invention can be utilized with any bluff body 10, and may be mounted at any type of structure on the trailing end 12 of a moving body 10 such as a doorframe, a vertically moving door or, in fact, no doors at all.

As the prior art drag reducing device 1, the drag reducing device according to the invention includes a first vertical panel 28 extending rearwardly from the trailing end 12 of the moving bluff body 10. The vertical panel 28 is at a position adjacent to the first side surface 16 thereof when deployed. Preferably, the vertical panel 28 is oriented under an angle of at least 180° to at most 210° with respect to the side surface 16 to form a side panel of a boat tail. A boat tail has a slightly conical shape in the extended configuration. As shown, the first vertical panel 28 is pivotally movably attached to the bluff body 10, in particular to the trailing end 12, in particular on a hinge 100 as a separate item between the rearwardly extending deployed position and a collapsed configuration immediately adjacent the first door 20. The panels of the prior art drag reducing device 1 are pivotally attached to the first and second doors 20, 22. Preferably according to the present invention, the panels of the drag reducing device 1 are pivotally movable attached to the side and top surfaces 16, 18, 14 of the bluff body 10.

The drag reducing device 1 according to the present invention further includes a second vertical panel 32 extending vertically in spaced relation with respect to the first vertical panel 28 such as to define a dead air space area 34 there between. Such a dead space area 34 significantly improves the airflow characteristics of the body 10 when moving. When deployed this second vertical panel 32 will preferably extend rearwardly substantially parallel to the second side surface 18 of the moving body 10. Second vertical panel 32 is in particular mounted with respect to a hinge 100 secured to the trailing end 12.

In the shown embodiment of the drag reducing device according to the invention, the drag reducing device comprises a first horizontal panel 36. The first horizontal panel 36 is rotatable about a horizontal axis. The horizontal panel 36 extends in a horizontal direction between the first vertical panel 28 and the second vertical panel 32 such as to define the dead space area 34 there below to enhance airflow past the moving body 10. The wording vertical or horizontal with respect to the panels here means that an axis of rotation of the panels to move the panels from the collapsed configuration to the extended configuration extends in a substantially vertical or substantially horizontal direction.

The first vertical panel 28 and in the left-sided part of the first horizontal panel 36 define a first panel structure 2 of the drag reducing device 1. The second vertical panel 32 and the right-sided part of the first horizontal panel 36 define a second panel structure 3 of the drag reduction device 1. The second panel structure 3 is in mirror symmetry with the first panel structure 2 of the drag reducing device 1.

The deployment of the first horizontal panel 36 which is usually positioned somewhat close to the top surface 14 of the moving body 10 has been a problem in that the first horizontal panel 36 must be deployed at a location relatively high on a truck or trailer at the trailing end 12 thereof between approximately 8 and 14 feet from ground level which is well beyond the reach of the vehicle operator. The inability to be able to manually reach this uppermost horizontal panel has required the use of additional implements such as poles, cranks, winches or other devices in order to fully deploy the first horizontal panel 36.

The drag reducing device as shown in FIG. 1C provides means for deployment of this first horizontal panel 36 responsive solely to deployment of the first vertical panel 28 and the second vertical panel 32 which are more easily reached by the operator. This deployment method is made possible by the configuration of the first horizontal panel 36 with a first frame means 38. First frame 38 is pivotally mounted with respect to the trailing end 12 of the moving body 10 and, in the configuration wherein doors are utilized, is pivotally mounted with respect to the first door 20 or the immediate frame area there around. The first frame 38 includes a first inner rib 40 which is pivotally mounted with respect to the rear cargo door and extends approximately perpendicularly outwardly therefrom when in the deployed position. The first frame 38 further includes a first outer rib 42 which is positioned in spaced relation from the first inner rib 40 and extends outwardly from the trailing end 12 angularly with respect thereto. With the first horizontal panel 36 in the fully deployed position and with the first vertical panel 28 in the fully deployed position, the first outer rib 42 will extend at an angle of approximately 45 degrees as shown by reference numeral 44 with respect to the trailing end 12 as well as with respect to the first vertical panel 28. This angular configuration results from orienting the alignment line 164, also called section pivot axis, of the outer ribs 42 and 68 in line with the point of pivot of the vertical panels 28 and 32.

A first cross strut 46 is also included within the first frame 38 and is of such a configuration as to preferably be integral with respect to the outermost ends of the first inner rib 40 and the first outer rib 42 for integrally connecting them with respect to one another. As such, the first frame 38 comprising the first inner rib 40, the first outer rib 42 and the first cross strut 46 is pivotally movable with respect to the trailing end 12 of the moving body 10 in such a manner as to facilitate deployment of the first horizontal panel 36.

As shown in FIG. 1C, a first mounting arm means 52 may extend parallel with respect to the trailing end 12 or with respect to the first cargo door 20 and is particularly advantageous when used in combination with a body configuration 10 having a locking bar 24 thereon. When used with a locking bar the first mounting arm 52 will preferably comprise two individual separated sections. The first part is the inside first mounting arm section 54 and the other part is the outside first mounting arm section 56. These two sections are spaced from one another to define an opening there between to allow full operational movement of the first locking bar 24. The inside first mounting arm section 54 and the outside first mounting arm section 56 are preferably coaxially mounted with respect to one another and may be pivotally mounted with respect to the trailing end 12. It should be appreciated that the mounting arms of the present invention could be omitted and replaced by a direct connection between the trailing end of the vehicle and the first covering means 62 extending over the first frame 38. This configuration would also achieve the desired pivotal connection between the frame and the body.

With this configuration the first frame 38 will assume a generally trapezoidal shape 58 with the base comprising the first mounting arm 52 and the opposite parallel side comprising the first cross strut 46 interconnected by the first inner rib 40 and the first outer rib 42 to form this trapezoidal shape 58. This trapezoidal shape and a cutaway 190 of the covering material and the flexible section 192 adjacent to the locking bar will provide sufficient clearance to allow movement of the first horizontal panel 36 from the stored position to the collapsed configuration and vice versa responsive to pivotal movement of the trapezoidal shaped frame 38 with respect to the trailing end 12.

To facilitate control of movement of the first frame 38 with respect to the moving body 10, a first link 60 is preferably pivotally secured to the inside portion of the first vertical panel 28. This link 60 can be achieved by a section of the covering material or can be a positive link such as by a first link arm 60. Either configuration will work sufficiently. With use of the first link arm 60, it is preferably also pivotally secured with respect to the first frame 38 to facilitate control during movement thereof between the collapsed and the extended configuration. This first frame 38 in combination with the first link 60 will provide the framework over which is positioned a first covering means 62 of flexible material. A plurality of sleeves may be defined in the first covering 62 which surrounds or holds therein the individual sections of the first frame 38 and the first link arm 60. For example the first inner rib sleeve means 63 will retain therein the first outer rib means 42.

With this configuration the first horizontal panel 36 can be defined. In fact the first horizontal panel 36 can be fully defined merely by the single first frame member 38 if the inside first mounting arm section 54 and the first cross strut member 46 are defined large enough to extend fully from the first vertical panel 28 to the second vertical panel 32. However, in this configuration as shown in FIG. 1C a second frame means 64 will also be included over which a second covering means (not shown) of flexible material will extend to define the portion of the first horizontal panel 36 which is adjacent to a second door 22. This second frame 64 can similarly comprise a second inner rib 66 positioned immediately adjacent to the first inner rib 40 of the first frame 38 when in the fully deployed position. Second inner rib 66 can extend rearwardly from the trailing end 12 approximately perpendicular to the surface of the second door 22 when in the fully deployed position. Second frame 64 will be pivotally movable with respect to the trailing end 12 to facilitate deployment of its portion of the first horizontal panel 36. The second frame 64 will include also a second outer rib means 68 angularly oriented with respect to the trailing end 12 at approximately a 45 degree angle shown by reference numeral 70 with respect thereto. A second cross strut means 72 will be included in the second frame 64 integrally interconnecting the second inner rib means 66 with the second outer rib means 68 in such a manner as to form a single integral second frame configuration 64.

The second frame covering means can be pivotally secured pivotally to the trailing end 12 itself or can be pivotally attached to a second mounting arm 78. Second mounting arm 78 preferably extends approximately parallel to the second door 22 and further preferably pivotal with respect thereto. This second mounting arm 78 will preferably be formed in two sections including the inside second mounting arm section 80 and the outside second mounting arm section 82. Sections 80 and 82 will preferably be coaxial with respect to one another and will be spaced from one another to define an opening there between through which the second locking bar 26 can extend. The spacing between the sections 80 and 82 can be great enough to allow positioning of two such second locking bars 26 there between. With this configuration the second frame 64 will take on a generally trapezoidal shape 84 formed by the two sections of the second mounting arm 78 and the second cross strut 72 which are parallel with respect to one another interconnected by the second inner rib means 66 of the second outer rib means 68. This trapezoidal shape 84, used in combination with the link means from the flexible cover fabric or the link arm itself, is important in allowing for full clearance of the locking bar associated with the door to which it is pivotally mounted while at the same time providing a full degree of movement of the first horizontal panel 36 between the fully deployed position and the stored position. Clearance adjacent the locking bars should also be provided by a cutaway of the material of the second covering means adjacent the locking bars.

Operation of the reducing drag device according to the invention is made quite simple by the coupled deployment and movement characteristics of this embodiment. In particular, for deployment the operator must initially rotate the first vertical panel 28 outwardly to a position parallel to the first side surface 16 which will automatically deploy the first frame 38 which will achieve deployment of the left half of the first horizontal panel means 36. The operator will then deploy the second vertical panel 32 by pivoting thereof to a position approximately parallel to the second side surface 18 which will achieve movement of the second frame 64 to the fully deployed position extending rearwardly approximately parallel to the second side surface 18. This movement will automatically achieve deployment of the right half of the first horizontal panel 36 which is adjacent to the second vertical panel 32. Movement from the extended configuration to the collapsed configuration requires a reversal of the above steps. Once the apparatus is deployed, movement from the collapsed configuration is enhanced by the inclusion of a first release cord means 90 extending from the first frame means 38 downwardly. If the operator pulls on the first release cord 90 in a downward direction this will cause a force against the spring biasing means which will urge the first frame means 38 to pivot downwardly and move toward the collapsed position. In a similar manner a second release cord 92 may be secured to the second frame 64 at a position thereon to allow an operator to pull downwardly on the release cord 92 thereby urging the second frame 64 to collapse downwardly for movement of the apparatus of the present invention to the collapsed position.

The second vertical panel 32 can be rotated to a position extending parallel with respect to the second cargo door 22 and the first vertical panel 28 can be rotated to a storage position extending parallel to the first cargo door 20. By movement of second vertical panel 32 to the stored position the second frame means 64 and the covering there over will be moved to the collapsed configuration extending downwardly parallel to the second door 22. Similarly movement of first vertical panel 28 to the collapsed configuration will cause movement of the left half of the first horizontal panel 36 or the first frame means 38 downwardly to a storage position parallel to the first door 20.

It should be appreciated that the preferred embodiment of the present invention provides an automated means for deploying of an apparatus for reducing drag at the rear of a moving vehicle which is easy to deploy and does not require any additional implements, tools or other special equipment to achieved full movement from full deployment to the collapsed configuration.

In an embodiment, the drag reducing apparatus of the present invention can be fully automatic. That is, deployment of only the first vertical panel 28 and the second vertical panel 32 will achieve full deployment. The deployment of these two panels can also be controlled by a remote activation means, possibly positioned within the driver's compartment, which can be electrically powered such as a solenoid control system. Of course, the two vertical panels can be manually deployed which will still fully deploy the entire drag reducing apparatus of the present invention.

Also it is important to note that the drag reducing device according to the present invention is movable to the fully stored position to allow full operation of the first and second doors 20 and 22 as conventionally included on the rear of a truck trailer and also to allow full operation of the first and second locking bars 24 and 26 normally included associated therewith. In an embodiment, the present invention also provides sufficient clearance for full operation of the locking bars while still allowing the first and second doors to be fully opened to a position extending forwardly toward the front portion of the vehicle parallel to the first and second side surfaces 16 and 18 as normally located during loading and unloading of such a trailer body.

As shown in FIG. 1C for the prior art drag reducing device, a full deployment of the first frame 38 to extend perpendicularly rearwardly from the trailing end 12 is enhanced by at least one bias element which includes a first inner spring biasing means 48 which is interconnected to the first inner rib 40 for biasing thereof toward the fully deployed position extending perpendicularly rearwardly from the trailing end 12. The configuration of this first inner spring biasing means 48 comprises a coil spring which is pre-loaded and attached to the first inner rib 40 for urging movement thereof to the deployed position. In a similar manner a first outer spring biasing means 50 may be included which is connected to the first outer rib means 42 in such a manner as to urge movement thereof toward the deployed position extending rearwardly from the trailing end 12.

The second frame 64 will be pivotally movable with respect to the trailing end 12 of the moving body 10 and can include a biasing means to facilitate urging thereof to the fully deployed position extending rearwardly from the second door 22. A second inner spring biasing means 74 can be connected to the second inner rib member 66 to facilitate movement thereof to the fully deployed position extending perpendicularly with respect to the second door 22. Also a second outer spring biasing means 76 can be connected to the second outer rib means 68 for urging movement thereof to the fully deployed position. Each of these biasing configurations can include a coil spring along with an end portion of the spring engaged with respect to the second inner rib 66 or the second outer rib 68 respectively to facilitate pivotal movement thereof to the fully deployed position.

With respect to the prior art drag reducing device as shown in FIG. 1A-1C, the invention has provided a drag reducing device with an improved bias element. The drag reducing device as shown in FIGS. 1A-1C illustrates an embodiment in which the bias element according to the invention can be implemented in addition to the spring biasing means 48, 50, 74, 76. The improved bias element comprises a bendable elongated spring element 200. The spring element 200 as provided by the invention has a longitudinal spring rod 210 having a first end 211 and second end 212. According to the invention, the spring element 200 is provided to exert a spring force to at least one of the panels a first panel structure 2 of the drag reducing device. By bending the spring element 200, the spring element 200 gets into a pre-tensioned condition. The bendable spring element 200 is mounted to the first panel structure 2 in a pre-tensioned condition.

Figure 2A:
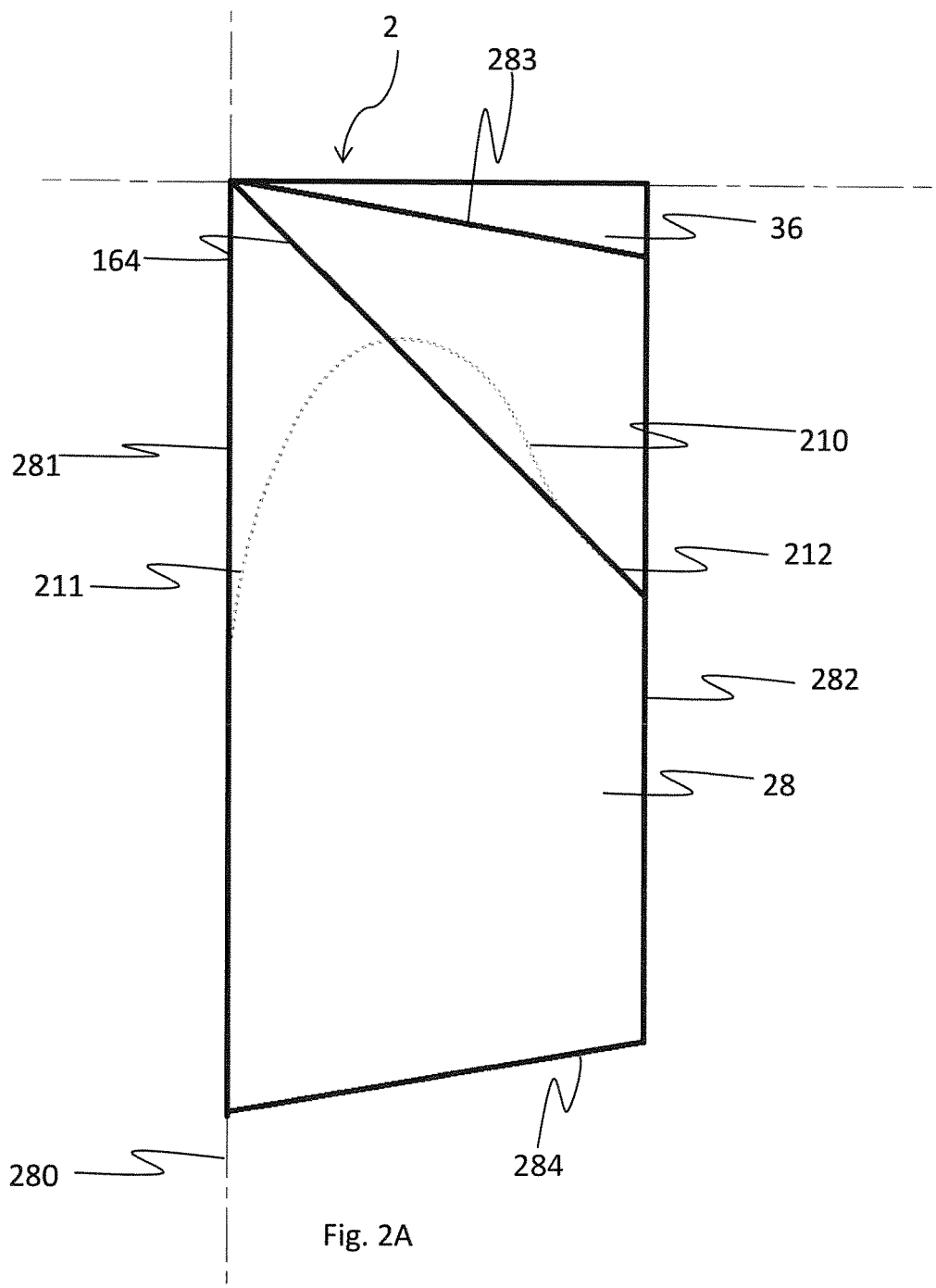
FIG. 2A shows in a front view of an embodiment of the drag reducing device according to the invention in a collapsed configuration.

In FIG. 2A, the drag reducing device including the bendable spring element 200 is shown in the collapsed configuration. The first vertical panel 28 and the left-sided part of the first horizontal panel 36 are in a folded position close to the trailing end 12 of the bluff body 10. The first vertical panel 28, also called a side panel, is rotatable about a first pivot axis 280.

The first panel 28 comprises a backside edge 281, a frontside edge 282, an upper edge 283 and a lower edge 284.

The first panel 28 is tapered in a direction to the front region. The upper and lower edge 283, 284 are inclined with respect to the backside edge 281.

The second panel of the first panel structure is defined by the left-sided part of the first horizontal panel 36. The second panel is a top panel. The top panel is sectioned. The top panel is a foldable panel. The top panel has a first section panel 36A and a second section panel 36B which are movable connected to each other about a section pivot axis 164. The top panel 36 has a backside edge 361, a frontside edge 362, a left-sided edge 363, and a right-sided edge 364. The left-sided edge 363 coincidence with the upper edge 283 of the first panel 28. The top panel 36 is connected to the side panel 28 by the coinciding left-sided edge 363 and upper edge 283. Herewith, the top panel 36 and side panel 28 of the panel structure are movable together.

Figure 2B:
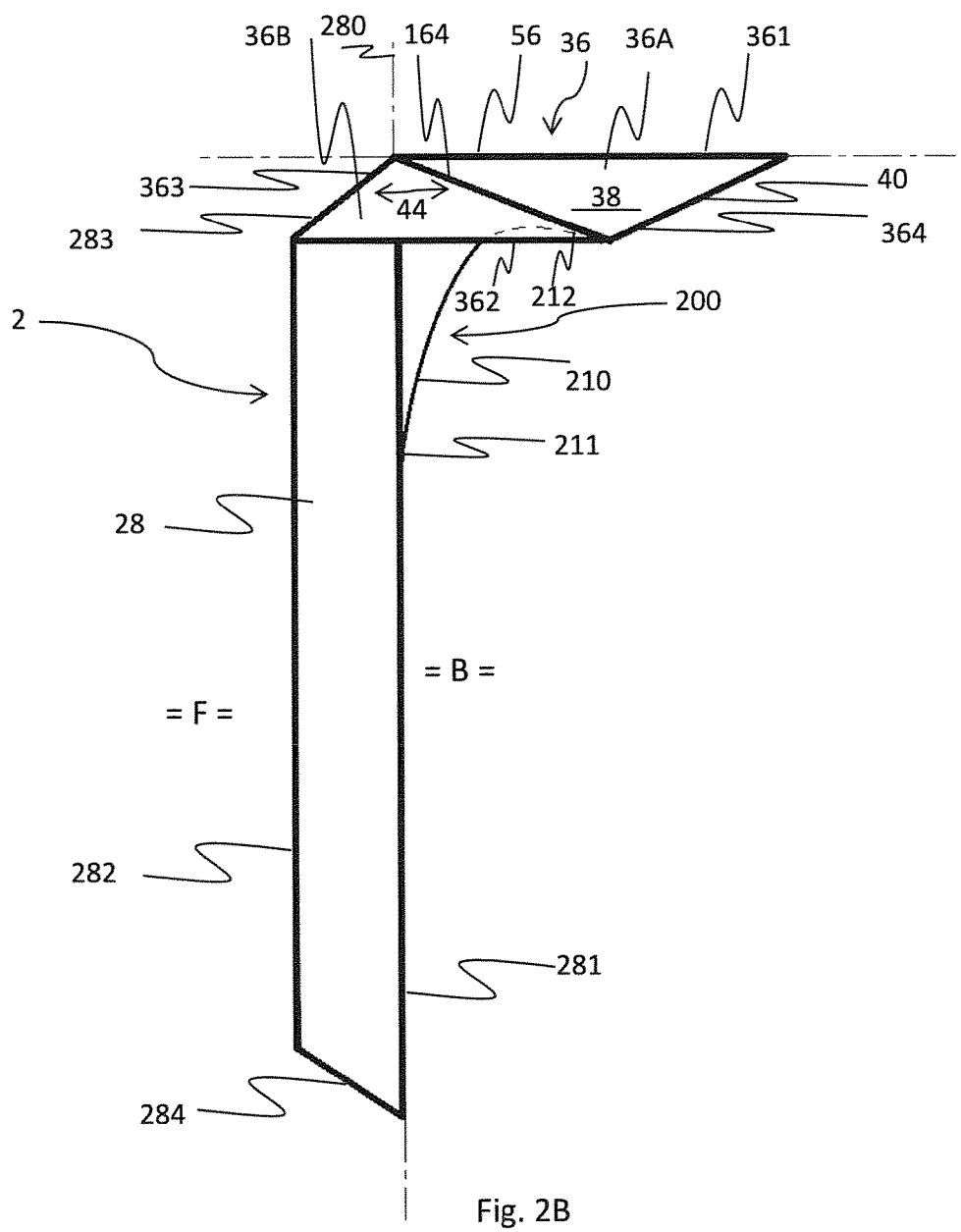
FIG. 2B shows in a perspective view the drag reducing device of FIG. 2A in an extended configuration.

As shown in FIG. 2B, the spring rod 210 has a first end 211 which is connected at a back region B of the drag reducing device. The second end 212 of the spring rod 210 is connected at a front region F of the drag reducing device. The first end 211 of the spring rod 210 is connected to the side panel 28. In particular, the first end 211 is connected to the side panel 28 in a region close to the backside edge 281. The second end 212 of the spring rod 210 is connected to the top panel 36. In particular, the second end 212 is connected to the top panel at a position adjacent to the front edge of the top panel. The second end 212 is connected to the top panel at the end of the section pivot axis 164. The longitudinal spring rod 210 extends along a curvature from the side panel 28 to the top panel 36. The curvature is arc-shaped. In particular, the longitudinal spring rod 210 extends from the backside edge 281 of the side panel 28 to the end of the section pivot axis 164. In particular, the spring rod 210 has a length of at least 0.5 m, more in particular at least 1.0 m.

Figure 3A:
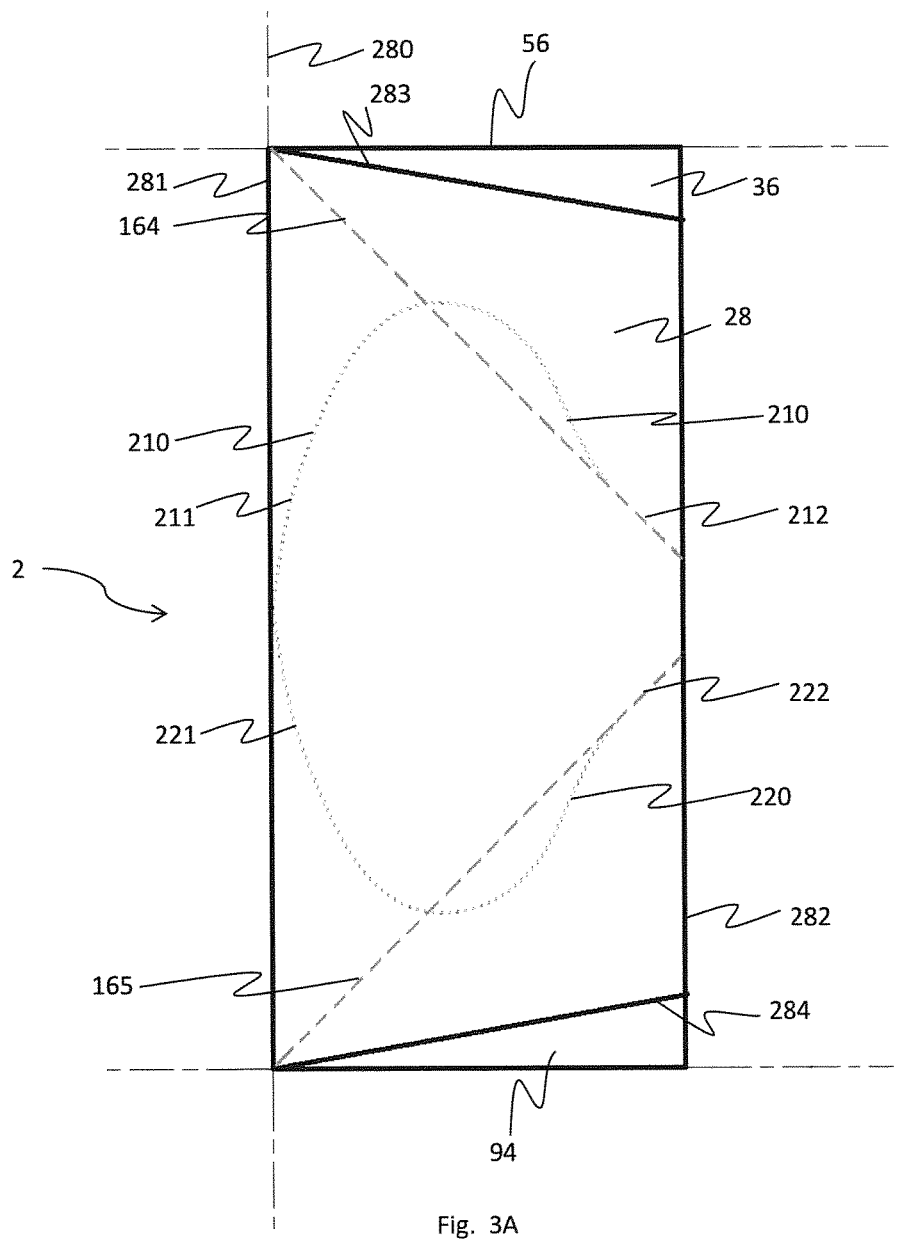
FIG. 3A shows in a front view an embodiment of the drag reducing device according to the invention which includes a bottom panel.

FIG. 3A shows the drag reducing device as shown in FIG. 2A in a collapsed configuration, wherein the drag reducing device comprises further a bottom panel 94. The bottom panel 94 is arranged in mirror symmetry about a horizontal axis with respect to the top panel 36. The bottom panel 94 is a foldable panel. The bottom panel 94 has a first panel section 94A and a second panel section 94B. The first and second panel sections 94A, 94B are rotatable connected about a section pivot axis 165. The lower portion of the first panel structure 2 is in mirror symmetry with the upper portion.

The bottom panel 94 has a backside edge 941, a frontside edge 942, a left-sided edge 943, and a right-sided edge 944. The left-sided edge 943 coincidence with the lower edge 284 of the first panel 28. The bottom panel 94 is connected to the side panel 28 by the coinciding left-sided edge 943 and lower edge 284. Herewith, the bottom panel 94 and side panel 28 of the panel structure 2 are movable together.

As shown in FIG. 3 A, a second spring element is provided which comprises a spring rod 220 which has a first end 221 which is connected at the back region B of the drag reducing device. The second and 222 of the spring rod 220 is connected at the front region F of the drag reducing device. The second spring element 220 is separate from the first spring element 210. The first end 221 of the spring rod 220 is connected to the side panel 28. In particular, the first end 221 is connected to the side panel 28 in a region close to the backside edge 281. The second end 222 of the spring rod 220 is connected to the bottom panel 94. In particular, the second end 222 is connected to the bottom panel at a position adjacent to the front edge of the bottom panel 94. The second end 222 is connected to the bottom panel at the end of the section pivot axis 165. The longitudinal spring rod 220 extends along a curvature from the side panel 28 to the bottom panel 94. The curvature is arc-shaped. In particular, the longitudinal spring rod 220 extends from the backside edge 281 of the side panel 28 to the end of the section pivot axis 165.

Figure 3B:
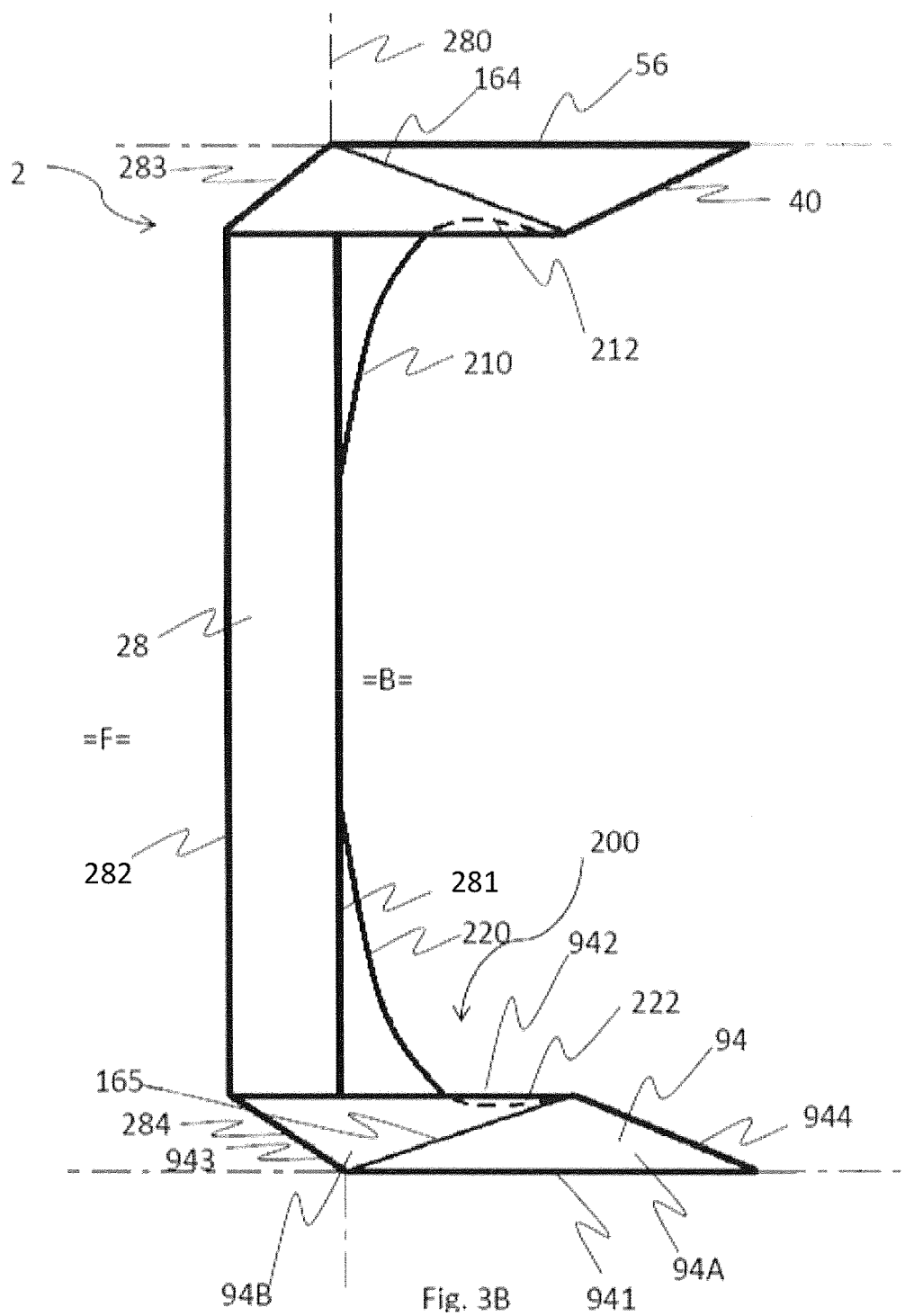
FIG. 3B shows in a perspective view the drag reducing device of FIG. 3A in the extended configuration.

As shown in FIG. 3B, the first and second spring element 210, 220 are integrated into a one-piece item. The integrated spring element extends from a first free end 212 to a second free end 222 and is positioned as described above with respect to the separate spring rods. A middle portion of the integrated spring element is positioned adjacent to the backside edge 281 of the side panel 28. The middle portion of the integrated spring element is left freely movable inside an inner space provided by the three panels. In particular, the integrated spring rod has a length of at least 2 m, more in particular at least 3 m.

It is noted that the term "comprising" (and grammatical variations thereof) is used in this specification in the inclusive sense of "having" or "including", and not in the exclusive sense of "consisting only of".

Although the invention has been disclosed with reference to particular embodiments, from reading this description those of skilled in the art may appreciate a change or modification that may be possible from a technical point of view but which do not depart from the scope of the invention as described above and claimed hereafter. Modifications may be made to adapt a particular situation or material to the teachings of the invention without departing from the essential scope thereof. It will be understood by those of skilled in the art that various changes may be made and equivalents may be substituted for elements thereof without departing from the scope of the invention. Therefore, it is intended that the invention is not limited to the particular embodiments disclosed in the above detailed description, but that the invention will include all embodiments falling within the scope of the appended claims.

Thus, the invention provides a drag reducing device comprising an improved bias element. The bias element supports a movement of at least one panel from a collapsed configuration to an extended configuration. The bias element includes a spring rod which effectively supports at least one panel, while at the same time maintains a simple and reliable configuration and operation of the drag reducing device.

The invention claimed is:

1. A drag reducing device (1) for reducing aerodynamic drag at a trailing (12) end of a moving bluff body (10), the device (1) comprising:
    a first panel structure (2) including at least a first and a second panel (36, 28) which are at a lateral region movably connected to each other to move together from a collapsed configuration wherein the panels (36, 28) are positioned close to the bluff body (10) to an extended configuration wherein the panels (36, 28) are rotated away from the trailing (12) end of the bluff body (10),
    wherein the first panel (36) is rotatable about a first pivot axis (360) to move the first panel (36) from the collapsed configuration to the extended configuration and wherein the second panel (28) is rotatable about a second pivot axis (280) to move the second panel (28) from the collapsed configuration to the extended configuration, the first pivot axis (360) extending substantially perpendicular to the second pivot axis (280),
    wherein at least one of the first or second panel (36,28) comprises at least a first and second panel section (36A, 36B) which are pivotally connected to each other about a section pivot axis (164), wherein the section pivot axis (164) originates from a point of intersection of the first pivot axis (280) and the second pivot axis (360) the section pivot axis (164) extending under an inclined angle away (44) from the first or second pivot axis (280,360), respectively, in a plane defined by the first panel (28) or the second panel (36), wherein at least one bias element is provided for exerting a spring force to the first panel structure (2) to support a movement of the panels (28,36) from the collapsed configuration to the extended configuration, wherein the at least one bias element comprises a first elongated bendable spring element (200) which first spring element (200) includes a longitudinal spring rod (210) having a first end (211) and a second end (212), wherein the spring rod (210) extends along a curvature in a pre-tensioned condition in between the first and second panel (28, 36) from a back region B of the drag reducing device to a front region F of the drag reducing device (1), such that the first spring element (210) exerts a spring force to the first or second panel (28, 36).

2. The drag reducing device (1) according to claim 1, wherein the second end (212) of the longitudinal rod (210) is connected at the front region F of a panel section.

3. The drag reducing device (1) according to claim 1, wherein the second end (212) of the longitudinal rod (210) is connected at an end region of the section pivot axis (164) of a sectioned panel (36A, 36B).

4. The drag reducing device (1) according to claim 3, wherein the first end (211) of the longitudinal rod (210) is connected at a region adjacent the pivot axis (280) of a panel neighboring the sectioned panel (36A, 36B).

5. The drag reducing device (1) according to claim 1, wherein the panel structure (2) further comprises a third panel (94), wherein the third panel (94) is rotatable about a third pivot axis (370) to move the third panel (94) from the collapsed configuration to the extended configuration, wherein the first (280), second (360) and third pivot axis (370) together define a C-shape, wherein the third panel (94) is movable connected to the first panel (28) at a lateral region of the third and first panel (28, 94) to move together from the collapsed configuration to the extended configuration, wherein at least one of the first or third panel (28, 94) comprises at least a first and second panel section (94A, 94B) which are pivotally connected to each other about a section pivot axis (165), wherein the section pivot axis (165) originates from a point of intersection of the first and third pivot axis (280, 370) and which section pivot axis (165) extends under an inclined angle away from the respectively first or third pivot axis (280, 370) in a plane defined by the respectively first or third panel (28, 94).

6. The drag reducing device (1) according to claim 5, wherein the at least one bias element comprises a second elongated bendable spring element, which second spring element includes a longitudinal spring rod (220) having a first and second end (221, 222), wherein the longitudinal spring rod (220) extends along a curvature in a pre-tensioned condition in between the first and third panel (28, 94) from a back region B of the drag reducing device to a front region F of the drag reducing device (1).

7. The drag reducing device according (1) to claim 5, wherein the second end of the second longitudinal rod is connected at the front region F of a panel section.

8. The drag reducing device according to claim 5, the second end (222) of the second longitudinal rod (220) is connected at an end region of the section pivot axis of a sectioned panel (94A, 94B).

9. The drag reducing device according to claim 8, wherein the first end (221) of the longitudinal rod (220) is connected at a region adjacent the pivot axis (280) of a panel (28) neighboring the sectioned panel (94).

10. The drag reducing device according to claim 5, wherein the first and second spring element are integrated into a one piece item to form an integrated spring element to exert a spring force on two panels of the panel structure.

11. The drag reducing device (1) according to claim 10, wherein the integrated spring element (200) is connected at an intermediate point at the back region (B) of the first panel (36).

12. The drag reducing device (1) according to claim 1, wherein the spring element (200) comprises a bundle of spring rods.

13. The drag reducing device (1) according to claim 1, wherein the spring element (200) has a longitudinal length with a varying thickness.

14. The drag reducing device (1) according to claim 1, wherein the spring element (200) comprises a reinforced plastic material.

15. The drag reducing device (1) according to claim 1, wherein the sectioned panel (36) of the panel structure (2) further comprises a blocking element to block a rotation of the first panel section (36A) about the section pivot axis (164) with respect to the second panel section (36B).

16. The drag reducing device (1) according to claim 1, wherein the drag reducing device (1) comprises a first and second panel structure (2, 3), wherein the first panel structure (2) is arranged opposite the second panel structure (3).

17. A vehicle having comprising
a drag reducing device (1), and
a bluff body (10), the bluff body (10) having a trailing end (12) wherein the drag reducing device (1) is connected to the trailing end (12) of the bluff body (10),
wherein the drag reducing device (1) includes a first panel structure (2) including at least a first and a second panel (36, 28) which are at a lateral region movably connected to each other to move together from a collapsed configuration wherein the panels (36, 28) are positioned close to the bluff body (10) to an extended configuration wherein the panels (36, 28) are rotated away from the trailing (12) end of the bluff body (10),
wherein the first panel (36) is rotatable about a first pivot axis (360) to move the first panel (36) from the collapsed configuration to the extended configuration and wherein the second panel (28) is rotatable about a second pivot axis (280) to move the second panel (28) from the collapsed configuration to the extended configuration, the first pivot axis (360) extending substantially perpendicular to the second pivot axis (280),
wherein at least one of the first or second panel (36,28) comprises at least a first and second panel section (36A, 36B) which are pivotally connected to each other about a section pivot axis (164), wherein the section pivot axis (164) originates from a point of intersection of the first pivot axis (280) and the second pivot axis (360) the section pivot axis (164) extending under an inclined angle away (44) from the first or second pivot axis (280,360), respectively, in a plane defined by the first panel (28) or the second panel (36),
wherein at least one bias element is provided for exerting a spring force to the first panel structure (2) to support a movement of the panels (28,36) from the collapsed configuration to the extended configuration,
wherein the at least one bias element comprises a first elongated bendable spring element (200) which first spring element (200) includes a longitudinal spring rod (210) having a first end (211) and a second end (212), wherein the spring rod (210) extends along a curvature in a pre-tensioned condition in between the first and second panel (28, 36) from a back region B of the drag reducing device to a front region F of the drag reducing device (1), such that the first spring element (210) exerts a spring force to the first or second panel (28, 36).

18. A method for opening and closing a drag reducing device (1) at a trailing end (12) of a bluff body (10), comprising the steps of:

providing a drag reducing device (1) including a first panel structure (2) including at least a first and a second panel (36, 28) which are at a lateral region movably connected to each other to move together from a collapsed configuration wherein the panels (36, 28) are positioned close to the bluff body (10) to an extended configuration wherein the panels (36, 28) are rotated away from the trailing (12) end of the bluff body (10), wherein the first panel (36) is rotatable about a first pivot axis (360) to move the first panel (36) from the collapsed configuration to the extended configuration and wherein the second panel (28) is rotatable about a second pivot axis (280) to move the second panel (28) from the collapsed configuration to the extended configuration, the first pivot axis (360) extending substantially perpendicular to the second pivot axis (280), wherein at least one of the first or second panel (36,28) comprises at least a first and second panel section (36A, 36B) which are pivotally connected to each other about a section pivot axis (164), wherein the section pivot axis (164) originates from a point of intersection of the first pivot axis (280) and the second pivot axis (360) the section pivot axis (164) extending under an inclined angle away (44) from the first or second pivot axis (280,360), respectively, in a plane defined by the first panel (28) or the second panel (36), wherein at least one bias element is provided for exerting a spring force to the first panel structure (2) to support a movement of the panels (28,36) from the collapsed configuration to the extended configuration, wherein the at least one bias element comprises a first elongated bendable spring element (200) which first spring element (200) includes a longitudinal spring rod (210) having a first end (211) and a second end (212), wherein the spring rod (210) extends along a curvature in a pre-tensioned condition in between the first and second panel (28, 36) from a back region B of the drag reducing device to a front region F of the drag reducing device (1), such that the first spring element (210) exerts a spring force to the first or second panel (28, 36), wherein the drag reducing device (1) comprises at least one bias element including an elongated bendable spring element (200) which comprises a longitudinal spring rod (210) having a first end (211) and a second end (212); and providing a spring force by the spring element (200) on at least one panel (28, 36) of a panel structure of the drag reducing device (1) to support a movement of the at least one panel (28,36) from a collapsed configuration to an extended configuration of the drag reducing device (1).

* * * * *